C. A. LEWIS.
PNEUMATIC TIRE FOR AUTOMOBILES AND OTHER VEHICLES.
APPLICATION FILED SEPT. 28, 1908.
933,715.
Patented Sept. 7, 1909.
2 SHEETS—SHEET 1.
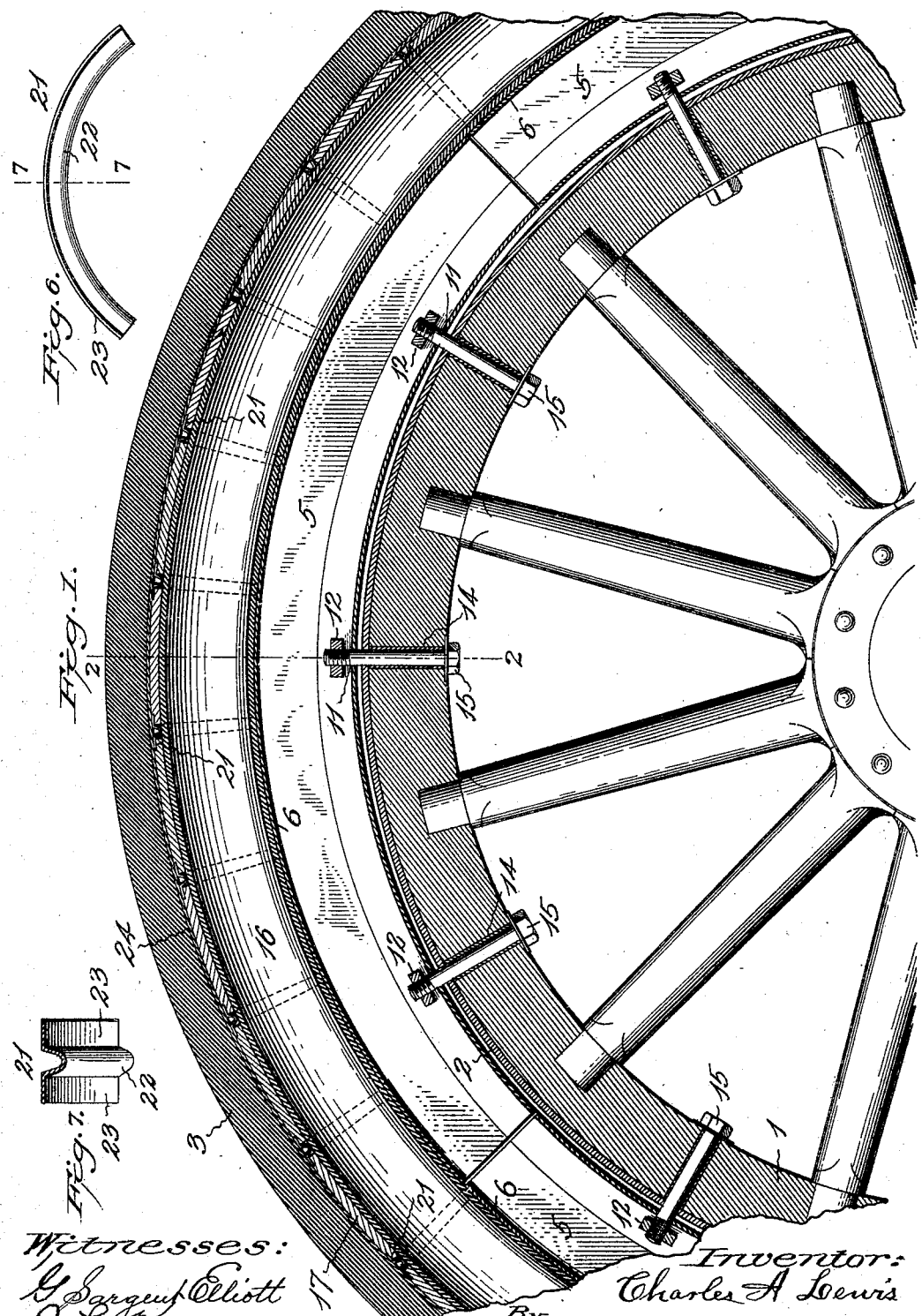
Witnesses:
G. Sargent Elliott
B. L. Kruser
Inventor:
Charles A. Lewis
By
H. S. Bailey, Attorney.

C. A. LEWIS.
PNEUMATIC TIRE FOR AUTOMOBILES AND OTHER VEHICLES.
APPLICATION FILED SEPT. 28, 1908.
933,715.
Patented Sept. 7, 1909.
2 SHEETS—SHEET 2.
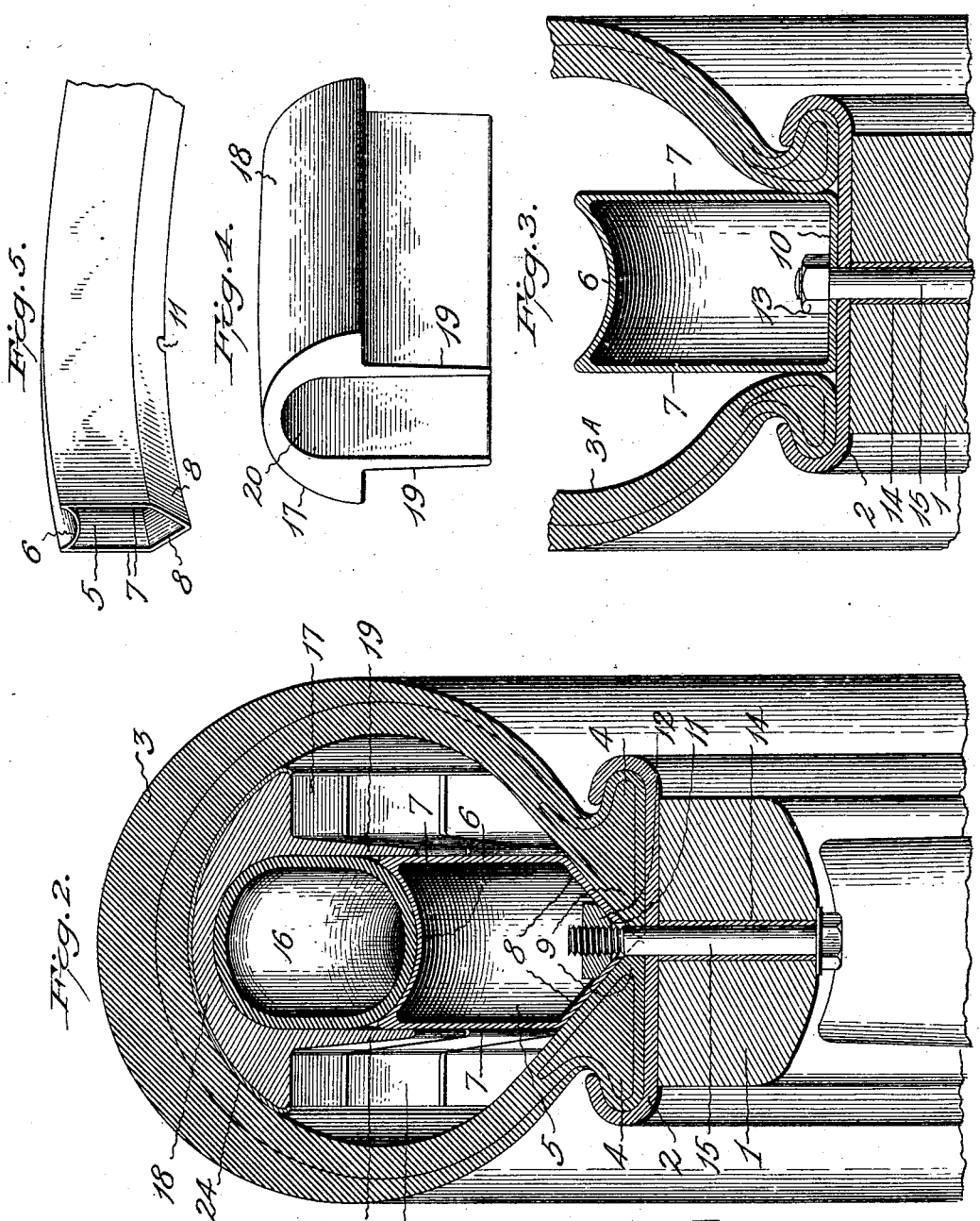

UNITED STATES PATENT OFFICE.

CHARLES A. LEWIS, OF DENVER, COLORADO, ASSIGNOR OF ONE-HALF TO WILLIAM A. DIBOLL, OF DENVER, COLORADO.

PNEUMATIC TIRE FOR AUTOMOBILES AND OTHER VEHICLES.

933,715. Specification of Letters Patent. Patented Sept. 7, 1909.

Application filed September 28, 1908. Serial No. 455,212.

*To all whom it may concern:*

Be it known that I, CHARLES A. LEWIS, a citizen of the United States of America, residing in the city and county of Denver and State of Colorado, have invented a new and useful Pneumatic Tire for Automobiles and other Vehicles, of which the following is a specification.

This invention relates to improvements in tires for automobiles and other vehicles.

The object of the invention is to provide a wheel with a hollow rubber tire, which is maintained in an expanded condition by an inner pneumatic tube, upon which is supported a plurality of plungers which bear against the inner surface of the tire, the tube being suitably supported upon the wheel felly.

The invention further consists in means for maintaining a predetermined uniform space between the plungers and also in various details of construction, all of which are fully set forth in the accompanying specification and claims and illustrated in the accompanying drawings, in which—

Figure 1, is a vertical, longitudinal, sectional view through a portion of an automobile wheel, constructed in accordance with my invention. Fig. 2, is an enlarged vertical, transverse, sectional view on the line 2—2 of Fig. 1. Fig. 3, is a view similar to Fig. 2, showing a modification in the form of inner tube supporting saddle, which permits the use of a different form of tire. Fig. 4, is a perspective view of one of the plungers. Fig. 5, is a perspective view, reduced of a portion of a saddle of the form shown in Fig. 2. Fig. 6, is a side elevation of one of the spacers, which lie between the adjacent ends of the plungers, and Fig. 7, is a transverse, sectional view of Fig. 6, on the line 7—7.

Referring to the accompanying drawings: the numeral 1, indicates the felly of an automobile wheel, and 2, the clencher rim, which is secured to the felly in the usual manner. A hollow tire 3, of any of the styles in general use is secured to the clencher rim in the well known manner by means of its engaging flanges 4, but before the tire is secured to the rim, the parts or elements constituting my invention are placed within the same, and comprise a plurality of plungers, a pneumatic tube upon which the plungers are supported, a plurality of curved saddles which support the tube and spacing means for maintaining a uniform distance between the adjoining plungers. For greater clearness, I will describe the parts in the reverse order, beginning with the saddles which support the other elements.

The saddles 5, form a complete circle or ring, which surrounds the clencher rim and they comprise segmental sections, which are placed end to end. Four of these saddles are preferably employed and each saddle comprises a hollow, metallic structure, consisting of an outer bridge plate 6, which is curved transversely and also on a line parallel with the curvature of the felly, side plates 7, and converging plates 8, which form a V shaped bearing edge, which rests upon the annular lips 9 of the tire. The saddles having the V shaped bearing edges, are the preferred form of saddle and are used in connection with tires of the construction shown in Fig. 2, where the annular lips meet and form a V shaped out-line in cross section, but where the style of tire $3^A$ is employed as illustrated in Fig. 3, the bearing faces 10 of the saddles are flat transversely and rest directly upon the clencher rim, while the sides of the saddles lie between the annular lips of the tire. A plurality of screw holes 11, are formed in the bearing face of each saddle and nuts 12, are brazed, or otherwise secured to the inner surfaces of the bearing faces in line with the screw holes. Opposite edges of these nuts are beveled to lie against the inclined sides of the bearing face when the preferred form of saddle is used, but when saddles having flat bearing faces are used, ordinary nuts 13 are employed.

The felly is provided with radial holes, corresponding in number with the holes in the saddles and in each one of these holes a sleeve 14 is driven. The saddles are positioned so that their screw holes are in line with the sleeves 14, and bolts or screws 15 are inserted in the sleeves and screwed into the nuts 12 or 13, as the case may be, to secure the saddles to the felly, but they are not secured until all the parts constituting the invention are assembled within the tire. After the saddles have been thus arranged, an inflatable tube 16 is placed around the saddles, so as to rest in the concaved faces thereof, the tube being provided with the usual nipple valve, not shown, to which an air pump may be attached for inflating the tube. A plurality of tire supporting plungers 17 are placed upon the tube and these plungers are each in the form of a short metal block, or section, comprising a body portion 18, which is curved transversely and longitudinally to conform to the curvature of the inner surface of the tire, and side plates 19, which depend from the body portion and form a channel 20, which is curved transversely and longitudinally to conform to the curvature of the inflatable tube. The plungers straddle the tube, which is thus completely incased and support and hold the tire in an expanded condition, when the tube 16 is inflated. The plates 19 overlap the saddles a short distance and prevent the plungers from twisting or inclining as they are moved inward and outward under the weight of the vehicle while the same is in motion, as will be readily understood by reference to Fig. 2. A slight space is left between the adjoining ends of the plungers, so as they move inward they will not jam, but in order to maintain a uniform space between the adjoining plungers throughout the circle, I employ spacers 21, which comprise thin metal plates, bent to conform to the transverse curvature of the plungers and which are formed with central longitudinal inwardly projecting U shaped projections or crimps 22, which are adapted to extend in between the adjoining ends of the plungers, while the flat members or flanges 23 of the spacers rest upon the adjacent ends of the plungers, as will appear by reference to Fig. 1. These spacers not only maintain a uniform distance between the adjoining ends of the plungers, but they also act as bridges, connecting the plungers so as to form a continuous support for the tire, and as each spacer rests upon two adjoining plungers, the pressure exerted upon each plunger will be communicated successively to the next adjoining plunger in order of the direction of rotation, thus maintaining a uniform resiliency throughout the revolution of the wheel.

In order to more thoroughly protect the tire against wear through contact with the plungers and spacers, I place a strip 24 of suitable material, preferably leather around the plungers and spacers, so that the tire will rest directly upon the strip. This completes the arrangement of the parts constituting my invention, and it only remains to secure the edges of the tire to the clencher rim and tighten the bolts 15, which draw the saddles in toward the clencher rim and clamp them against the lips of the tire, after which the inner tube is inflated, thereby forcing the plungers against the tire, which is expanded and held in an expanded condition by the air pressure in the tube.

The construction herein set forth produces a resilient tire, and one in which the pneumatic tube is protected against any possibility of puncture, while the practically continuous ring formed by the plungers and spacers affords smooth, even and uniform contact of the tire, with the surface of the road or street throughout the revolution of the wheel.

The invention is adaptable to any of the forms of tires in present use and requires no change in the construction of the present form of wheel, other than in providing the bolt holes through which saddle securing bolts are passed.

Having described the invention what I claim as new, and desire to secure by Letters Patent, is:

1. In a device as specified, the combination with a wheel felly and a hollow tire upon said felly, of a plurality of saddles within the tire, which form a continuous structure and rest upon the annular lips of the tire, bolts passing through the felly, which clamp the saddles upon the said annular lips, said saddles having concaved faces, which form a continuous channel, a pneumatic tube in said channel, a plurality of plungers, which straddle the tube and support the tire in an expanded condition, and means for maintaining uniformity of space between the adjoining ends of the plungers.

2. In a device as specified, the combination with a wheel felly and a hollow tire thereon of a pneumatic tube within the tire, a plurality of saddles arranged in circular form and having channeled faces for supporting the tube, and means, such as bolts, which pass through the felly for clamping the saddles upon the annular lips of the tire, a plurality of plungers, which straddle the tube and overlap the saddles, said plungers being adapted to hold the tire in an expanded condition and spacing devices interposed between the ends of the adjoining plungers.

3. In a device as specified, the combination with a wheel felly, a clencher rim thereon, and a hollow tire on the clencher rim, of a plurality of hollow saddles within the tire arranged in circular form and having concaved outer faces, nuts secured within the saddles, and bolts which pass through the felly into the nuts and clamp the saddles upon the annular lips of the tire, a pneumatic tube supported upon the concaved faces of the saddles, a plurality of tire supporting channeled plungers, which straddle the tube and overlap the saddles, so as to inclose the tube, spacing devices interposed between the ends of the adjoining plungers and a flexible shield interposed between the plungers and the tire.

4. In a device as specified, the combination with a felly, a hollow tire on the felly, a circular support within the tire, a pneumatic tube upon the support and plungers which straddle the tube and bear against the tire of spacing devices, interposed between the ends of the adjoining plungers, comprising metal plates, bent to conform to the transverse curvature of the plungers and provided with central longitudinal U shaped crimps, which are adapted to lie between the adjoining plungers, while the plate rests upon the said plungers.

In testimony whereof I affix my signature in presence of two witnesses.

CHARLES A. LEWIS.

Witnesses:
G. SARGENT ELLIOTT,
AGNES McNAIR.